(12) United States Patent
Richardson et al.

(10) Patent No.: US 11,389,994 B2
(45) Date of Patent: Jul. 19, 2022

(54) METHOD AND DEVICE FOR APPLICATION OF STRUCTURAL MATERIALS

(71) Applicant: Zephyros, Inc., Romeo, MI (US)

(72) Inventors: Henry E. Richardson, Washington, MI (US); Patrick Moore, Lapeer, MI (US)

(73) Assignee: ZEPHYROS, INC., Romeo, MI (US)

( * ) Notice: Subject to any disclaimer, the term of this patent is extended or adjusted under 35 U.S.C. 154(b) by 861 days.

(21) Appl. No.: 15/797,320

(22) Filed: Oct. 30, 2017

(65) Prior Publication Data

US 2018/0050474 A1 Feb. 22, 2018

Related U.S. Application Data

(63) Continuation of application No. 14/990,867, filed on Jan. 8, 2016, now Pat. No. 9,802,342, which is a
(Continued)

(51) Int. Cl.
| | | |
|---|---|---|
| *B29C 44/12* | (2006.01) | |
| *F16B 3/00* | (2006.01) | |
| *B29C 37/00* | (2006.01) | |
| *B29C 65/56* | (2006.01) | |
| *B29C 65/00* | (2006.01) | |

(Continued)

(52) U.S. Cl.
CPC ...... *B29C 44/1214* (2013.01); *B29C 37/0085* (2013.01); *B29C 65/565* (2013.01); *B29C 66/30325* (2013.01); *B29C 66/71* (2013.01); *B29C 66/727* (2013.01); *B29C 66/73121* (2013.01); *B29C 66/742* (2013.01); *F16B 3/005* (2013.01); *B29K 2063/00* (2013.01);
(Continued)

(58) Field of Classification Search
CPC ............ B29C 44/1214; B29C 37/0085; B29C 65/565; B29C 66/30325; B29C 66/71; B29C 66/73121; B29C 66/742; F16B 3/005; Y10T 403/47; B29K 2063/00; B29K 2105/04; B29L 2031/737
See application file for complete search history.

(56) References Cited

U.S. PATENT DOCUMENTS

| | | |
|---|---|---|
| 3,591,996 A | 7/1971 | Shanok et al. |
| 4,610,836 A | 9/1986 | Wycech |

(Continued)

FOREIGN PATENT DOCUMENTS

| | | |
|---|---|---|
| CN | 1342182 A | 3/2002 |
| DE | 10052108 A1 | 5/2002 |

(Continued)

OTHER PUBLICATIONS

International Search Report and Written Opinion dated Jul. 28, 2011 for related PCT Application No. US2011/037271 filed May 20, 2011; Published as WO 2011/146793 A1 dated Nov. 24, 2011.

(Continued)

*Primary Examiner* — Robert S Walters, Jr.
(74) *Attorney, Agent, or Firm* — The Dobrusin Law Firm, P.C.

(57) ABSTRACT

There is disclosed a method of applying activatable material to a member of an article of manufacture such as an automotive vehicle. According to the method, the activatable material is provided to an applicator followed by applying the activatable material to the member wherein the activatable material is attached by way of a mechanical interlock via one or more through-holes.

20 Claims, 4 Drawing Sheets

Related U.S. Application Data continuation of application No. 13/112,102, filed on May 20, 2011, now Pat. No. 9,259,867.

(60) Provisional application No. 61/347,067, filed on May 21, 2010.

(51) Int. Cl.
*B29K 63/00* (2006.01)
*B29L 31/00* (2006.01)
*B29K 105/04* (2006.01)

(52) U.S. Cl.
CPC ..... *B29K 2105/04* (2013.01); *B29L 2031/737* (2013.01); *Y10T 403/47* (2015.01)

(56) References Cited

U.S. PATENT DOCUMENTS

| | | |
|---|---|---|
| 4,868,968 A | 9/1989 | Dixon et al. |
| 5,086,997 A | 2/1992 | Glass |
| 5,348,604 A | 9/1994 | Neff |
| 5,358,397 A | 10/1994 | Ligon et al. |
| 5,712,317 A | 1/1998 | Makhlouf et al. |
| 5,755,486 A | 5/1998 | Wycech |
| 5,810,956 A | 9/1998 | Tanis et al. |
| 5,839,847 A | 11/1998 | Patel |
| 6,021,753 A | 2/2000 | Chaffin et al. |
| 6,093,358 A | 7/2000 | Schiewe et al. |
| 6,131,897 A | 10/2000 | Barz et al. |
| 6,305,136 B1 | 10/2001 | Hopton et al. |
| 6,311,452 B1 | 11/2001 | Barz et al. |
| 6,421,979 B1 | 7/2002 | Fischer et al. |
| 6,467,834 B1 | 10/2002 | Barz et al. |
| 6,573,309 B1 | 6/2003 | Reitenbach et al. |
| 6,753,379 B1 | 6/2004 | Kawate et al. |
| 6,846,559 B2 | 1/2005 | Czaplicki et al. |
| 6,892,993 B2 | 5/2005 | Palmer |
| 6,926,784 B2 | 8/2005 | Bock |
| 7,043,815 B2 | 5/2006 | Lande et al. |
| 7,048,019 B2 | 5/2006 | Pacitto et al. |
| 7,077,460 B2 | 7/2006 | Czaplicki et al. |
| 7,180,027 B2 | 2/2007 | Hable et al. |
| 7,249,415 B2 | 7/2007 | Larsen et al. |
| 7,290,828 B2 | 11/2007 | Kosal et al. |
| 7,673,930 B2 | 3/2010 | Stratman |
| 7,748,773 B2 | 7/2010 | Niezur |
| 7,892,396 B2 | 2/2011 | Sheasley |
| 7,913,467 B2 | 3/2011 | Schneider et al. |
| 8,250,725 B2 | 8/2012 | Sigler et al. |
| 2002/0088908 A1 | 7/2002 | Broccardo et al. |
| 2002/0174954 A1 | 11/2002 | Busseuil et al. |
| 2005/0020703 A1 | 1/2005 | Czaplick et al. |
| 2005/0087899 A1 | 4/2005 | Coon et al. |
| 2006/0008615 A1 | 1/2006 | Muteau et al. |
| 2006/0045866 A1 | 3/2006 | Chappelow et al. |
| 2006/0057333 A1 | 3/2006 | Brahim |
| 2006/0188693 A1 | 8/2006 | Brozenick et al. |
| 2008/0023987 A1 | 1/2008 | Schneider |
| 2008/0029200 A1 | 2/2008 | Sheasley |
| 2008/0029214 A1 | 2/2008 | Hable et al. |
| 2008/0060742 A1 | 3/2008 | Sheasley et al. |
| 2008/0202674 A1 | 8/2008 | Schneider et al. |
| 2009/0108626 A1 | 4/2009 | Richardson et al. |
| 2011/0189428 A1 | 8/2011 | Belpaire et al. |
| 2011/0236616 A1 | 9/2011 | Belpaire |

FOREIGN PATENT DOCUMENTS

| | | |
|---|---|---|
| EP | 1428744 A1 | 6/2004 |
| EP | 1932648 A | 6/2008 |
| EP | 2147848 A1 | 1/2010 |
| EP | 2427362 | 3/2012 |
| WO | 2003/000535 | 1/2003 |
| WO | 2011/146793 A1 | 11/2011 |

OTHER PUBLICATIONS

IPER, International Preliminary Examining Authority, International Application No. PCT/2011/037271 dated Jul. 11, 2012.
Chinese Office Action dated Jul. 28, 2014; Application No. 2011800305358.
Chinese Second Office Action dated Mar. 31, 2015; Application No. 2011800305358.
European Office Action dated Nov. 13, 2015; Application No. 11721974.1.

METHOD AND DEVICE FOR APPLICATION OF STRUCTURAL MATERIALS

CLAIM OF PRIORITY

The present application claims the benefit of the filing dates of U.S. application Ser. No. 14/990,867, filed Jan. 8, 2016, U.S. application Ser. No. 13/112,102, filed May 20, 2011, and U.S. Provisional Application Ser. No. 61/347,067, filed May 21, 2010, which are hereby incorporated by reference for all purposes.

FIELD

The present teachings relates generally to a method of applying activatable material to a member wherein the activatable material self-anchors by forming a mechanical interlock with one or more through-holes. The activatable material may be employed for providing adhesion; reinforcement: sealing; baffling; noise, vibration, and/or harshness reductions, a combination thereof, or the like.

BACKGROUND

For many years, industry has been concerned with designing and, providing activatable materials for providing adhesion; baffling; sealing: noise, vibration, and/or harshness reduction; reinforcement; the like, or a combination thereof to articles of manufacture such as automotive vehicles. More recently, it has become important to apply these materials in a condition that ekes the materials more adaptable to further processing or assembly of the articles of manufacture. As an example, it may be desirable to apply an activatable material to a substrate prior to activation wherein the substrate requires no prior treatment and the activatable material is attached by interlocking with one or more through-holes via forming the shape of the activatable material to adapt to the shape of the through-holes so that the activatable material holds itself in place. In another example, the activatable materials may be applied to a first surface that includes fasteners and then the surface and the activatable material are applied to the article of manufacture: thus, requiring multiple steps so that the article of manufacture is prepared for use.

Some challenges faced by known materials are that the materials need to be pre-shaped, include one or more mechanical fasteners, or some other adhesive so that the materials are held in place in the pre-activation state. Other challenges faced by known materials is that the materials require one or more processing steps before the materials are applied to an article of manufacture. For example, the material is first applied to a carrier and then the carrier and the material is applied to the article of manufacture. In another example, the material must be shaped and/or formed before the material is attached to the article of manufacture. Some examples of materials and application methods of materials may be found in U.S. Pat. Nos. 5,358,397; 6,311, 452; 6,926,784; and 7,249,415; and U.S. Patent Application Nos. 2006/0008615; 2006/0045866; 2006/0057333; and 2008/0023987, all of which are incorporated by reference herein for all purposes. Therefore, it is desirable to have a material that is applied directly to an article of manufacture and the material self-anchors itself to the article of manufacture. Furthermore, it is desirable to have a material that does not require any additional processing steps or components so that the material is attached to the article of manufacture.

SUMMARY

One possible embodiment of the present teachings includes: a material comprising: a pre-activation state, and the material in the pre-activation state includes: a viscosity and the viscosity of the material is sufficient so that a pressure of applying the material is enough to move the material through one or more through-holes in an article of manufacture, and the material conforms to the one or more through holes to self-anchor the material to the article of manufacture to resist pull-though.

Another possible embodiment of the present teachings includes: a method comprising: obtaining an article of manufacture that includes one or more through-holes; obtaining an activatable material; and applying the activatable material to the article of manufacture in a continuous bead that spans between the one or more through-holes so that the activatable material is forced through the one or more through-holes forming a mechanical interlock between the article of manufacture and the activatable material The present teachings contemplate an adhesive material that may be attached to an article of manufacture or a carrier in its pre-activation state without any mechanical fasteners. The adhesive material, in its pre-activation state, conforms to the through-holes of the article of manufacture or carrier (e.g. a substrate, a member, or the like) so that the adhesive material self-anchors and attaches to the article of manufacture or the carrier.

A method is provided for applying an activatable material directly to a member for providing adhesion; baffling: sealing; noise, vibration, and/or harshness reduction; reinforcement; the like, or a combination thereof to the member. The member may be formed to have one or more through-holes for accepting a portion of the activatable material and maintaining the location of the activatable material on and/or within all or a portion of the member. The member may further require no treatment, coatings (e.g., adhesives or the like), or heating for improving the adhesion of the activatable material to the member. According to the method the activatable material may be provided to an applicator. Typically, the activatable material includes an epoxy resin, although an epoxy resin is not necessarily required. The activatable material may include a solid epoxy resin, a liquid epoxy resin, or a combination thereof. The applicator applies the activatable material (e.g., as a bead) upon a surface of a member of an article of manufacture such as an automotive vehicle.

The present teachings provide a material that self-anchors to an article of manufacture so that the material resists pull-through. The material is applied directly to the article of manufacture without any additional manufacturing steps and/or articles of manufacture. The material includes a viscosity that allows the material to be forced through one or more through-hole openings in an article of manufacture so that the material is securely attached to the article of manufacture in its pre-activation state. The material is cured so that the material activates attaching the article of manufacture to another article of manufacture and permanently securing the material to the article of manufacture via the through-hole openings.

BRIEF DESCRIPTION OF THE DRAWINGS

The features and inventive aspects of the present teachings will become more apparent upon reading the following detailed description, claims, and drawings, of which the following is a brief description:

DETAILED DESCRIPTION OF THE PREFERRED EMBODIMENT

Figure 1A:
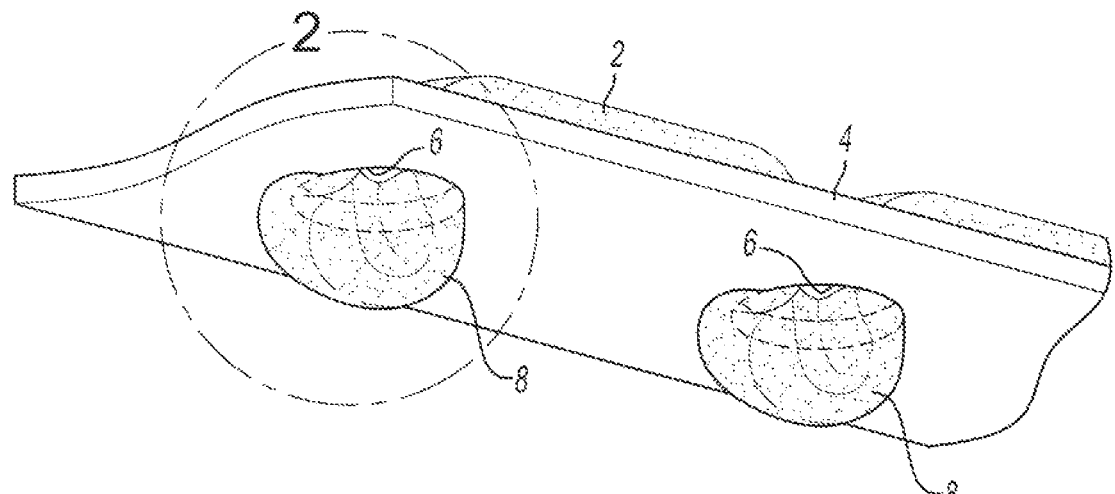
FIG. 1A is a bottom perspective view illustrating one example of the activatable material, prior to activation, applied to a member in accordance with the present teachings.

The following description of the preferred embodiment(s) is merely exemplary in nature and is in no way intended to limit the teachings, its application, or uses.

The present teachings are a method for applying an activatable material to a surface of a member. Generally, it is contemplated that the material may be applied to various members such as members that are part of a body, a frame, an engine, a hood, a trunk, a bumper, roof, door, tail-gate, a combination thereof, or the like of an automotive vehicle. It is also contemplated that the member may be a carrier for a reinforcement, a baffle, a seal, a combination thereof, or the like of the automotive vehicle.

The method typically includes the steps of: providing an activatable material to an applicator; providing a member of an article of manufacture having one or more through-holes; applying the activatable material to the member so that a portion of the activatable material is located proximate or within the one or more through-holes; and optionally, further processing the member, the article of manufacture, or both.

As used for the present teachings, the term activatable material is intended to mean a material that can be activated to cure, expand (e.g., foam), soften, flow, or a combination thereof. Thus, it is contemplated for the present teachings that an activatable material may be activated to perform only one of the aforementioned activities or any combination of the aforementioned activities unless otherwise stated.

The activatable material may comprise a plurality of pellets or a bead that are fed into an intrusion device in a solid (though pliable) form in accordance with the teachings of commonly owned U.S. Pat. No. 5,358,397 ("Apparatus For Extruding Flowable Materials"), hereby expressly incorporated by reference, such type of apparatus being referred to herein as a "mini-applicator" so that the pellets or beads may be extruded along and onto portions of an article of manufacture. A preferred mini-applicator is an extrude-in-place device suitable for extrusion with or without robotic assistance, and which may be portable or remain stationary in a predetermined location. The use of a mini-applicator advantageously allows extrusion of meltable plastic materials of various section sizes or shapes directly at production or assembly lines. The pellet may then expand and bond to the member and the body panel when exposed to the e-coat process as well as other paint operation cycles encountered in a final vehicle assembly facility. In addition, it is contemplated that the present teachings may utilize an application of expandable material directly to a structural member or trim component of an automotive vehicle.

The applicator as discussed herein may include a one or more controllers, sensors, regulators, or a combination thereof. The applicator may have a senor that measures the temperature, shear rate, pressure, viscosity, or a combination thereof of the activatable material. The sensor may feed the measured condition to the controller and the controller may adjust one or more process condition so that the activatable material is moved through a through-hole and creates a mechanical interlock and/or self-anchors to resist pull-through.

The activatable material may be placed onto a member with no application of heat to promote bonding. As the assembly is prepared for final assembly of the vehicle, it is processed through e-coat or other heat-inducing paint operations which result in expansion and bonding of the activatable material from the member to an adjacent wall where the activatable material cures and remains in place.

The activatable material may be placed onto a member using atmospheric pressure, and atmospheric pressure may force the activatable material through one or more through-holes in the substrate or member so that the activatable material self-anchors. The amount of pressure used may be constant for the entire duration of the application process. The amount of pressure used may vary. The amount of pressure may be varied based upon the viscosity of the activation material, the speed of application, orifice size, or a combination thereof. For example, temperature and/or shear rate may be changed until the activatable material flows out of the applicator at atmospheric pressure. Preferably, the activatable material is applied to the substrate and/or member using a pressure that is higher than atmospheric pressure. More preferably, the amount of pressure used to apply the activatable material may be any pressure so that the activatable material is applied to a surface of the substrate or member and the activatable material is forced into and through the one or more through-holes so that the activatable material self-anchors. Most preferably, temperature, pressure, shear, or a combination thereof may be adjusted so that the activatable material flows out of the applicator and onto an article of manufacture and through the through-holes so that the activatable material self-anchors to the article of manufacture. The amount of pressure used to apply the activatable material may be about $1 \times 10^5$ Pa or more, about $1.5 \times 10^5$ Pa or more, about $5 \times 10^5$ Pa or more, or about $1 \times 10^6$ Pa or more. The amount of pressure used to apply the activatable material may be about $1 \times 10^8$ Pa or less, about $1 \times 10^7$ or less, or about $5 \times 10^6$ or less.

The pressure in applying the activatable material may be consistently applied along the entire length of the substrate or member. The pressure of the activatable material during application may vary along the length of the substrate or member. The pressure may be decreased in the region surrounding the though-holes. Preferably, the pressure may be increased in the region surrounding the through-holes. The application pressure may be increased by about 10 percent or more, about 20 percent or more, about 30 percent or more, about 40 percent or more, or even about 50 percent or more in the region surrounding the through-holes. For example, the application pressure may be about $5 \times 10^5$ Pa when the activatable material is applied to a surface the application pressure may be increased to about $1 \times 10^6$ Pa when the activatable material is being applied in the through-hole region. It is contemplated that the application pressure may initially be increased in the region surrounding the through-holes and then decreased back to normal so that some activation material is forced through the through-hole and then additional material is placed on the surface of the substrate or member.

The activatable material, in a pre-activation state, includes a viscosity. The viscosity of the activatable material may be any viscosity that allows the activatable material to be forced through the through-holes in the substrate or member. The viscosity of the activatable material may be any viscosity so that the activatable material resists pull through once the activatable material is forced through one or more through-holes in a substrate or member. The viscosity of the activatable material may be any viscosity so that the activatable material may be forced through one or more through-holes in a substrate or member and the activatable member is self-anchoring. The viscosity of activatable material may be sufficient so that once the activatable material is applied and forced through the through-holes the activatable material maintains contact with the article and/or does not become unattached. The viscosity of the activatable material may be low enough so that the viscosity flows when subjected to atmospheric pressure. Preferably, the viscosity of the activatable material is high enough so that the viscosity does not flow when subjected to atmospheric pressure. More preferably, the viscosity of the activatable material is any viscosity so that the activatable material is forced through one or more through-holes in a substrate or member and the activatable material once through the substrate or member self-anchors and resist being pulled back through the one or more through-holes.

The temperature of the activatable material may be any temperature and may be measured at any location in the process. Preferably, the temperature of the activatable material as discussed herein is the temperature of the activatable material as measured shortly before and/or during the application process. The temperature of the activatable material may be between about 0° C. and 300° C., between about 25° C. and 200° C., preferably between about 50° C. and about 150° C., and more preferably between about 85° C. and, about 110° C.

The activatable material may be subject to shear while located in the applicator. The activatable material may be subject to shear during the application process. The shear rate experienced by the activatable material may be any shear rate so that the activatable material flows. The shear rate experienced by the activatable material may be any shear rate so that the activatable material flows and remains attached to the article. The shear rate may be about 0 or greater, about 100 or greater, about 500 or greater or even about 1000 or greater (sec−1). The shear rate may be about 10,000 or less, about 5,000 or less, or preferably about 2,000 or less (sec−1). The shear rate may be between about 0 and about 10,000 (sec−1), preferably between about 0 and about 5,000 (sec−1), and more preferably between about 0 and about 1,000 (sec−1).

The activatable material may be any viscosity so that that the activatable material flows, and preferably flows through a through-hole and self-anchors to the article of manufacture (i.e. a substrate or a member). The viscosity of the activatable material may be about 100 PaS or more, about 200 PaS or more, or preferably about 300 PaS or more. The viscosity of the activatable material may be about 10,000 PaS or less, preferably about 8,000 PaS or less, or more preferably about 6,000 PaS, or less.

The viscosity of the activatable material at a temperature of between about 80° C. and about 120° C. may be about 100 Pa*s or higher, about 200 Pa*s or higher, preferably about 300 Pa*s or higher, or more preferably about 400 Pa*s or higher measured at a shear rate of between about 0 and about 1000 (sec−1). The viscosity of the activatable material at a temperature of between about 80° C. and about 120° C. may be about 10,000 Pa*s or lower, about 8,000 Pa*s or lower, preferably about 6,000 Pa*s or lower, or more preferably about 5,000 Pa*s or lower measured at a shear rate of between about 0 and about 1000 (sec−1).

The viscosity of the activatable material may be varied by heating the activatable material. The viscosity of the activatable material may change by about 1 P*s or more, about 5 Pa*s or more, about 10 Pa*s or more, or even about 20 Pa*s or more for every 1° C. the temperature increases or decreases. The viscosity of the activatable material may change by about 100 Pa*s or less, about 50 Pa*s or less, about 40 Pa*s or less, or even about 30 Pa*s or less for every 1° C. the temperature increases or decreases. The viscosity of the activatable material may change by about 1 Pa*s or more, about 5 Pa*s or more, about 10 Pa*s or more, or even about 20 Pa*s or more for every 50 sec−1 that shear increases or decreases. The viscosity of the activatable material may change by about 100 Pa*s or less, about 50 Pa*s or less, about 40 Pa*s or less, or even about 30 Pa*s or less for every 50 sec−1 that shear increases or decreases. The present teachings may employ one or more methods discussed herein to adjust viscosity. For example, the composition of the activatable material may be varied by increasing or decreasing the amount of a less viscous or more viscous substances, increasing or decreasing the amount of substances with a low or high molecular weight, increasing the temperature of the activatable material, increasing or decreasing the amount of shear, or a combination thereof so that the viscosity is increased or decreased.

It is contemplated that if temperature is used to increase the viscosity (i.e. change the flow characteristics of the activatable material) that the temperature may be high enough so as to create a first level of activation upon cooling of the activatable material. Preferably, the temperature of the activatable material remains low enough so that the activatable material is not activated as the activatable material is applied to the substrate or member. The temperature of the activatable material may be high enough so that the viscosity changes and the activatable material is forced though holes in the substrate or member and upon cooling the viscosity of the activatable material decreases so that the activatable material self-anchors to the substrate or member and resists pull-though.

The size, shape, diameter, or a combination thereof of the application orifice may be changed as the activatable material passes though the nozzle during the application step. The application orifice may be a constant size, shape, diameter, or a combination thereof. However, the application orifice may have a variable size, shape, diameter, or a combination thereof. The pressure in applying the activatable material may remain constant along the length of the substrate or member. The pressure in applying the activatable material may be varied by changing the size, shape, diameter, or a combination thereof of the application orifice. For example, the diameter of the application orifice may be reduced in size when the activatable material is being applied in the through-hole region. The reduction in size may temporarily increase the force in which the activatable material is applied to the through-hole so that the activatable material is pushed through the through-hole so that the activatable material self-anchors. It is contemplated to that once some material is forced through the through-hole that the size of the application orifice may be increased so that a constant amount of material is applied along the length of the application surface. It is further contemplated that the orifice may be increased over the through-holes building up an amount of activatable material and then the orifice size decreased so that the pressure is increased and the activatable material is forced through the through-holes.

The method of applying the activatable material may be any method so that the activatable material self-anchors to the substrate or member. The activatable material may be applied to a surface of the structure or member at a constant rate. The activatable material may be applied to the surface at a variable rate. For example, the activatable material may be applied at one rate between through-holes and the rate may be reduced at the through-holes so that additional material may be added at that location to compensate for the volume of activatable material that passes into the through-hole. The activatable material may be applied at a rate of about 1 cm/second or more, about 10 cm/second or more, or about 20 cm/second or more. The activatable material may be applied at a rate of about 100 cm/second or less, about 50 cm/second or less, or about 40 cm/second or less. The activatable material may be applied at a rate, in the through-hole region, that is about 50 percent or slower, about 60 percent or slower, or about 70 percent or slower than when the activatable material is being applied to the region outside the through-hole regions. For example, if the activatable material is being applied at a rate of 20 cm/second between the through-hole regions it will be applied at the through-hole regions at a rate of about 10 cm/second if the rate is reduced by 50 percent.

The activatable material may be applied using one or more of the methods, techniques, or steps discussed herein. The pressure for applying the activatable material may be formed by the weight of the activatable material pushing the activatable through the orifice. The weight of the activatable material may create a "head" such as a hydraulic head. The application speed may be varied by creating a taller or shorter column of activatable material. In a preferred embodiment the orifice size of the application device is constant and the size of the activatable material is varied by adjusting the application speed of the applicator (i.e. moving the applicator or the article of manufacturer faster or slower).

Depending upon the technique employed for providing the activatable material to the applicator, the various components of the activatable material may intermix within the applicator, may be intermixed prior to being provided to the applicator, may intermix upon or after exiting the applicator, or a combination thereof. Typically, it is desirable for the activatable material to be substantially homogeneous upon application to a substrate, although not required.

Generally, it is contemplated that the activatable material may be provided to an applicator using a variety of techniques. It is further contemplated that the activatable material may be provided to the applicator in a variety of conditions. For instance, the activatable material may be solid, semi-solid, flowable, liquid, a combination thereof or the like. Moreover, the activatable material may be provided to the applicator as a substantially continuous mass or as a plurality of masses (e.g., pellets).

The activatable material may be formed of a variety of suitable materials. In one embodiment, the activatable material is formed of a heat activated material having foamable characteristics, although not required. In alternative embodiments, the material may be non-foamable or non-expanding. The material may be generally dry to the touch (e.g., non-tacky) or slightly tacky, or more substantially tacky and may be shaped in any form of desired pattern, placement, or thickness, but is preferably of substantially uniform thickness. Preferably, the activatable material when applied has some tack so that the tackiness of the activatable material assists in holding the activatable material on the article of manufacture.

From a chemical standpoint for a thermally-activated material, which may be structural, sealing, or acoustical, can be initially processed as a flowable material before curing, and upon curing, the material will typically cross-link making the material incapable of further flow.

The activatable material may include a polymeric admixture, an impact modifier and one or a combination of a blowing agent, a curing agent, or a filler. Additional aspects of the present teachings may be gleaned from the teachings herein, including those of Column 7; line 38 to Column 8; line 41 of U.S. Pat. No. 7,892,396 incorporated by reference herein, which shows various curing agents and fillers that may be used in the activatable material.

The activatable material preferably includes at least three of the following: about 2 to about 80 percent by weight epoxy resin; about 2 to about 70 percent by weight polymer or oligomer (e.g., epoxy)/elastomer adduct; one or more additional polymers, which typically include a one or more ethylene polymers or copolymers: about 2 to about 70 percent by weight impact modifier; up to about 5 parts by weight of a blowing agent; up to about 7 parts by weight of a curing agent; and a filler. Additional aspects of the present teachings may be gleaned from the teachings herein, including those of Column 2; line 36 to Column 3; line 10 of U.S. Pat. No. 7,892,396 incorporated by reference herein, which shows various Epoxy Resins that may be used in the activatable material. Additional aspects of the present teachings may be gleaned from the teachings herein, including those of Column 3; lines 11 to 67 of U.S. Pat. No. 7,892,396 incorporated by reference herein, which shows various Adducts that may be used in the activatable material. Additional aspects of the present teachings may be gleaned from the teachings herein, including those of Column 4; lines 1 to 28 of U.S. Pat. No. 7,892,396 incorporated by reference herein, which shows various Polymers or Copolymers that may be used in the activatable material.

The concentration may be higher or lower depending upon the intended application of the activatable material. In a preferred aspect of the teachings, the impact modifier includes one or more core/shell polymers. Additional aspects of the present teachings may be gleaned from the teachings herein, including those of Column 5; line 31 to Column 6; line 67 of U.S. Pat. No. 7,892,396 incorporated by reference herein, which shows venous impact modifiers that may be used in the activatable material.

It is also contemplated that the activatable material may include one or more conductive materials, which can assist in weld-through of the material. Examples of such materials include graphite, carbon-black, iron phosphide, metal particulate (e.g., pellets, shavings or the like), combinations thereof or the like. Additional aspects of the present teachings may be gleaned from the teachings herein, including those of Column 8; lines 43 to 67 of U.S. Pat. No. 7,892,396 incorporated by reference herein, which shows various additives that may be used in the activatable material.

Generally, applicators of the present teachings may apply activatable material of the present teachings to a substrate or member in a variety of configurations and may apply the material to a variety of members. The activatable material may be applied in any configuration so that the activatable material is useful for one or more of the purposes discussed herein. Preferably, the activatable material is applied, so that the activatable material self-anchors to the substrate or member to which it is applied. As examples, it is contemplated that the activatable material may be applied as continuous (e.g., as a singular continuous mass) or discontinuous (e.g., as multiple separated masses) mass. Furthermore, the activatable material may be applied in a variety of shapes (e.g., as a bead, as a layer or otherwise) and a variety of thickness. The activatable material may be applied to the substrate or member in a pre-activation state. The activatable material may be applied in a semi-activated states (e.g. the activatable material may be heated to a temperature so that curing has begun as the activatable material is being applied).

The dimensions of the activatable material, in a pre-activation state, may be any dimension so that the activatable material may be used for one or more of the purposes discussed herein. For example, the activatable material may be applied so that it includes a thickness (i.e. an amount of material measured from the substrate or member to the top of the activatable material); a width (i.e. from one longitudinal edge of activatable to the opposing longitudinal edge of activatable material); and a length (i.e. from a proximal end to a distal end of the activatable material). The thickness may be between about 0.1 mm to about 2 cm, preferably between about 0.5 mm to about 5 mm, and more preferably between about 3 mm and about 4 mm although such thickness may vary widely depending upon the desired function or particular application of the activatable material. The width may be between about 0.1 mm to about 2 cm, preferably between about 0.5 mm to about 5 mm, and more preferably between about 3 mm and about 4 mm. The length of the activatable material will vary depending on the application, substrate or article, and application style (e.g. continuous or discontinuous). The activatable material may be applied so that the activatable material has a diameter (e.g. is generally round or oval shaped). Typically, the activatable material will form a "D" shape on the substrate or member. The activatable material may be applied so that the activatable material is any shape. The activatable material once applied may have a generally non-uniform structure. For example, the dimensions of the activatable material may vary along the length of the surface. In another example, the activatable material may become thinner at the through-holes. The activatable material may include partial gaps in the through-hole regions. For example, a portion of the activatable material will enter into the hole and some material will be placed around the hole so that the hole remains visible due to the material not completely filling the through-hole. However, it is contemplated that the activatable material may be thicker at the through-holes so that the through-holes are not visible after the activatable material is applied to the through-hole region. The activatable material may be substantially uniform along the length, width, or both of the surfaces.

The diameter of the activatable material in the largest dimension other than length (i.e. thickness, width, or a distance between the two) may be about 0.1 mm or greater, about 0.5 mm or greater, about 1.0 mm or greater, preferably about 2.0 mm or greater, or more preferably about 3.0 mm or greater. The activatable material in the largest dimension may be about 5 cm or less, about 4 cm or less, preferably about 3 cm or less, more preferably about 2 cm or less, or most preferably about 1 cm or less. The diameter in the largest dimension may be between about 0.5 mm and about 1 cm and preferably between about 2 mm and about 5 mm.

It is contemplated that the size of the activatable material, in its pre-activation state, may vary slightly after application (i.e. the material may flow, densify, expand, compress, or a combination thereof) affecting the size of the activatable material on the substrate or member.

The activatable material once forced through the through-hole may have a shape. The shape of the activatable material on the back side of the surface may be any shape so that the activatable material self-anchors and resists pull-through. The activatable material may form a mushroom shaped button, a "T" shape, may curl over the edge, may fold over the edge, or a combination thereof. The activatable material may project straight through the through-hole so that the size of the activatable material is substantially the same as the through-hole. The activatable material may form an angle relative to the through-hole so that the activatable material self-anchors and resists pull-through.

The activatable material of the present teachings has been found particularly useful for applications requiring sealing and structural reinforcement. For these applications, expansion of the activatable material is typically small if there is any expansion at all. In general, it is desirable for the material to include good adhesion durability. Moreover, it is typically desirable that, the material does not generally interfere with the materials systems employed by automobile or other manufacturers.

In applications where the activatable material is a heat activated material, an important consideration involved with the selection and formulation of the material is the temperature at which a material cures and, if expandable, the temperature of expansion. Typically, the material becomes reactive (cures, expands, or both) at higher processing temperatures, such as those encountered in an automobile assembly plant, when the foam is processed along with the automobile components at elevated temperatures or at higher applied energy levels, e.g., during paint curing steps. Additional aspects of the present teachings regarding expansion may be gleaned from the teachings herein, including those of Column lines 1 to 37 of U.S. Pat. No. 7,892,396 incorporated by reference herein, which shows various Blowing Agents that may be used in the activatable material. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. The activatable material may be cured by more than one temperature. Additional aspects of the present teachings regarding two temperature curing may be gleaned from the teachings herein, including those of Paragraphs 0094 to 0107 of U.S. Patent Application No. 2008/0029214 incorporated by reference herein, which shows various materials, agents, and methods that may be used to two temperature cure the activatable material.

The activatable material as discussed herein may be cured by methods other than temperature. The activatable material may be cured by moisture. Additional aspects of the present teachings regarding moisture cure may be gleaned from the teachings herein, including those of Paragraphs 0076 to 0093 of U.S. Patent Application No. 2008/0029214 incorporated by reference herein, which shows various materials, agents, and methods that may be used to moisture cure the activatable material. The activatable material may be cured by exposure to other stimulus such as UV light, energy waves, microwaves, or a combination thereof. Additional aspects of the present teachings regarding stimulus curing may be gleaned from the teachings herein, including those of Paragraphs 0115 to 0119 of U.S. Patent Application No.

2008/0029214 incorporated by reference herein, which shows various materials, agents, and methods that may be used to stimulus cure the activatable material.

If the activatable material is expandable, it may be configured to have a wide variety of volumetric expansion levels. As an example, the activatable material may expand to at least about 101%, at least about 300%, at least about 500%, at least about 800%, at least about 1100%, at least about 1500%, at least about 2000%, at least about 2500% or at least about 3000% its original or unexpanded volume. Of course, in other embodiments, the expandable material may be configured to have less volumetric expansion, particularly for structural applications. For example, the expandable material may be configured to expand between about 110% and about 700% (i.e., about 10% to about 600% greater that than the original unexpended volume), more typically between about 130% and about 400% its original or unexpanded volume.

Upon application to a member and thereafter, it may be desirable for the activatable material to exhibit, desired characteristics to allow for further processing or assembly of the activatable material, the member to which it is applied or both. For example, it may be desirable for the activatable material to be elastic such that it can be deformed or stretched followed by allowing the material to at least partially regain its original configuration.

After activation and depending upon the intended use of the activatable material, the material will typically exhibit one or more desired characteristics such as strength, sound absorption, vibration dampening, combinations thereof, or the like. It is possible that the activatable or activated material can exhibit a shear strength (e.g., a lap shear strength) greater than about 500 psi, more typically greater than about 1000 psi, even more typically greater than about 1500 psi and still more typically greater than about 2200 psi.

The activatable material may exhibit one or more of the characteristics discussed herein when applied to a substrate or a member discussed herein. The activatable material and the substrate or member may form a mechanical interlock therebetween so that the activatable material is anchored to the substrate or member without the addition of any other materials. The substrate or member includes one or more surfaces that include through-holes. The substrate or member may include one or more through-holes on each surface. The through-holes may be formed at any location along the surface so that upon application of the activatable material, the activatable material contacts the one or more-through holes so that the through-holes maintain the location of the activatable material on or within the member. As such, no additional materials (e.g., adhesives) or treatments (e.g., heating or cooling) may be required to maintain the position of the activatable material upon or within the member. The activatable material and substrate or member may be free of any material used to assist in holding the activatable material on the substrate or member. The activatable material and substrate or member may be free of mechanical fasteners. The activatable material and substrate or member may be free of push pins. The activatable material and substrate or member may be free of an adhesive. The activatable material in its pre-activation and/or post activation states may be free of tack (i.e. is dry to the touch). The activatable material in its pre-activation and/or post activation states may be tacky.

The through-holes may be formed by moving material so that a hole is formed in the substrate or member. For example, the through-holes may be formed or punched through the member so that the through-holes include one or more side walls as a result of the forming process such that the side walls of the through-holes may contact the activatable material to assist in maintaining the position of the activatable material. During formation of the through-holes, rosettes (i.e. flared pieces of substrate or the member) may be formed so that as the activatable material is forced through the through-holes the activatable material becomes intertwined in the rosettes and self-anchors the activatable material. The through-holes may be formed by removing material. For example, the holes may be formed by drilling, cutting (e.g. with a torch, laser, plasma cutter, or the like), melting, or a combination thereof. The through holes may be integrally formed during creation of the substrate or member. The substrate or member may be free of any configuration that assists in attachment of the activatable material. The substrate may include one or more features discussed herein for assisting in attaching the activatable material to the substrate or member.

The substrate or member may include one or more through-holes for attachment. Preferably, the substrate or member includes at least two through-holes on each surface that are configured to receive activatable material. It is contemplated that if a surface includes two through-holes that the through-holes may be located on opposing end regions of the surface; however, the through-holes may be located at almost any location along the surface. Preferably, each surface includes a plurality of through-holes. More preferably, each surface includes a sufficient amount of through-holes so that the activatable material may self-anchor. The number of through-holes and distance between the through-holes may be dependent on one or more variables such as size of the through-hole, material of the substrate, viscosity of the activatable material, temperature of the activatable material, length of the substrate or member, chemical composition of the activatable material, strength characteristics of the substrate or member, bead size of the activatable material, or a combination thereof.

The through-holes may be spaced apart on each surface. The distance between the through-holes may be any distance so that the through-holes do not affect the structural integrity of the surface, the substrate, or the member. Preferably, the through-holes are spaced far enough apart that the structural integrity of the substrate or member is not affected but close enough so that the activatable material is held in place between the through-holes. The distance between through holes may vary from application to application. The through-holes may be spaced about 1 mm or more apart, about 5 mm or more apart, preferably about 7 mm or more apart, or more preferably about 1 cm or more apart. The through-holes may be spaced about 20 cm or less, about 10 cm or less apart, about 5 cm or less apart, preferably about 4 cm or less apart, or more preferably about 3 cm or less apart. The through-holes may be spaced about 1 cm to about 10 cm apart, preferably about 1.5 cm to about 5 cm apart, and more preferably about 1.8 to about 2.5 cm apart. The spacing of the through-holes may depend on the diameter of the through-hole. For example, if the through holes are 2 mm in diameter then they may be spaced about 2 cm apart, and if the through-holes are 5 mm in diameter then they may be spaced about 1.5 cm apart. The through-holes may be spaced unevenly apart. For example, two holes may be 1 cm apart and the next two holes may be 3 cm apart. The spacing between the through-holes may be any spacing discussed herein.

The largest dimension of the through-holes (e.g. diameter of the through-holes) may be any dimension so that the activatable material may be forced through the through-hole and self-anchor. The largest dimension may be any size so that the activatable material may be forced through the through-hole and self anchor. Preferably the largest dimension may be any size so that the activatable material may be forced through the through-hole and not sag off of the article of manufacture. For example, if the dimension is too large than the weight of the activatable material during application may cause the activatable material to sag and break off of the article of manufacture. The shape of the through-holes may be any shape so that the activatable material self-anchors to the substrate or member. The through-holes may be shaped like a star, square, rectangular, triangle, heart, "U," "C," "X," the like, or a combination thereof. Preferably the through-holes are circular or oval. The dimension of the through-holes may vary from application to application. The dimension of the through-holes may be about 1 mm or larger, about 2 mm or larger, preferably about 3 mm or larger, or more preferably about 4 mm or larger. The dimension of the through-holes may be about 3 cm or less, about 2 cm or less, preferably about 1 cm or less, or more preferably about 0.8 cm or less. The dimension of the through-holes may be between about 2 mm and 1.0 cm and preferably between about 4 mm and 8 mm. The size, shape, dimension, or a combination thereof may vary from location to location. For example, one through-hole may be a square and the next through-hole may be a circle.

The members to which the activatable material are applied may be configured for installation within a variety of articles of manufacture as discussed. Preferably, the activatable material is applied to a member that is to be assembled to an automotive vehicle. Members that may be assembled to an automotive vehicle can include, without limitation, body members (e.g., inner or outer quarter panels, inner or outer panels of a vehicle door, hood, roof, closure panel, a bumper, a pillar, combinations thereof or the like), frame members (e.g., frame rails), engine or chassis components or other members. Other members, which may be assembled to an automotive vehicle include carrier members, which may be used to form baffles, reinforcement members, combinations thereof or the like. The members may be made of any material used to make an article of manufacture, and preferably an automotive vehicle. The members may be made of metal, plastic, a synthetic material, a natural material, or a combination thereof. Preferably, the members are made of steel.

The activatable material may be useful in adhering; baffling; sealing; reducing noise, vibration, and/or harshness; reinforcing; strengthening; or a combination thereof at least two articles of manufacture together. The activatable material may be useful in adhering; baffling; sealing; reducing noise, vibration, and/or harshness; reinforcing; strengthening; or a combination thereof at least two articles of manufacture together that are made of similar materials. The activatable may be useful in adhering; baffling; sealing; reducing noise, vibration, and/or harshness; reinforcing; strengthening; or a combination thereof at least two articles of manufacture together that are made of dissimilar materials.

The present teachings may be created using a method. The method may include one or more of the method steps discussed herein. The method may include the creation of the activatable material. The activatable material may be created by combining one or more of the ingredients recited herein into a mixing vessel. The ingredients may be mixed until the ingredients are thoroughly mixed forming a homogeneous mixture. The ingredients may be heated. The ingredients may be cooled. The viscosity of the ingredients may be measured. The viscosity of the mixture may be increased. The viscosity of the ingredients may be reduced. The molecular weight of the mixture may be increased. The molecular weight of the mixture may be reduced. The activatable material, raw materials, or both may be moved to the application device. The activatable materials, raw materials, or both may be mixed in the application device. The application device may be an extruder. The application device may be a mini-applicator.

The present teachings may include obtaining a substrate or member (e.g. an article of manufacture). The present teachings may include one or more steps in preparing the substrate or member. Through-holes may be drilled into the substrate or member. Through-holes may be punched into the substrate or article of manufacture. The through-holes may be polished, sanded, ground, or a combination thereof after creation.

The present teachings may include one or more steps of applying the activatable material. The steps of applying the activatable material may include the step of measuring the viscosity. The viscosity may be adjusted. The temperature may be measured. The temperature may be adjusted. The amount of shear applied to the activatable material may be adjusted. The application pressure may be tested. The application pressure may be adjusted. The step of applying the activatable material may include a step of measuring all of the process variables discussed herein and adjusting one or more of the process variables (e.g. viscosity; temperature; orifice size, shape, diameter; chemical composition; pressure; or a combination thereof) so that the activatable material once applied self-anchors to the substrate or member and resists pull-through. The application may include a controller that controls one or more process variable. The applicator may adjust one or more process variable. The method of applying the activatable material may further include the steps of increasing or decreasing the rate of application of the activatable material. Adjusting the speed the application device moves, the part moves relative to the application device, or both. Adjusting the size of the opening of the application orifice. The method further contemplates performing one or more of the method steps disclosed herein simultaneously. For example, the speed at which the activatable material is applied may be increased and the orifice opening may simultaneously be decreased as the orifice enters the through-hole region.

Illustrative Embodiments

The following examples are provided to illustrate the teachings, but are not intended to limit the scope thereof.

FIG. 1A illustrates the activatable material 2 in its pre-activation state applied to an article of manufacture 4. The article of manufacture 4 includes a plurality of holes 6 and the activatable material 2 extends through the holes forming a mechanical interlock 8 so that the activatable material 2 is self-anchored to the article of manufacture 4.

Figure 1B:
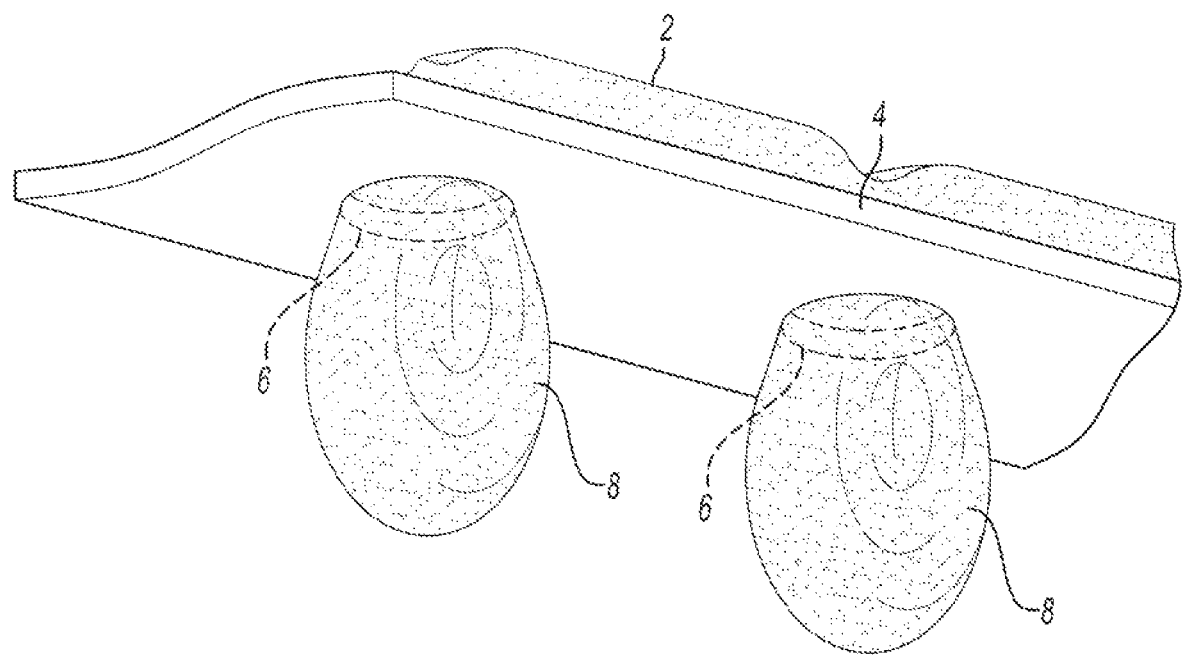
FIG. 1B is a bottom perspective view illustrating the member and activatable material of FIG. 1A after activation of the activatable material.

FIG. 1B illustrates the activatable material 2 in its post-activation state. The activatable material 2 is expanded on both sides of the plurality of holes 6 and forms a mechanical interlock 8 so that the activatable material 2 resists pull-though and is self-anchored to the article of manufacture 4.

Figure 2:
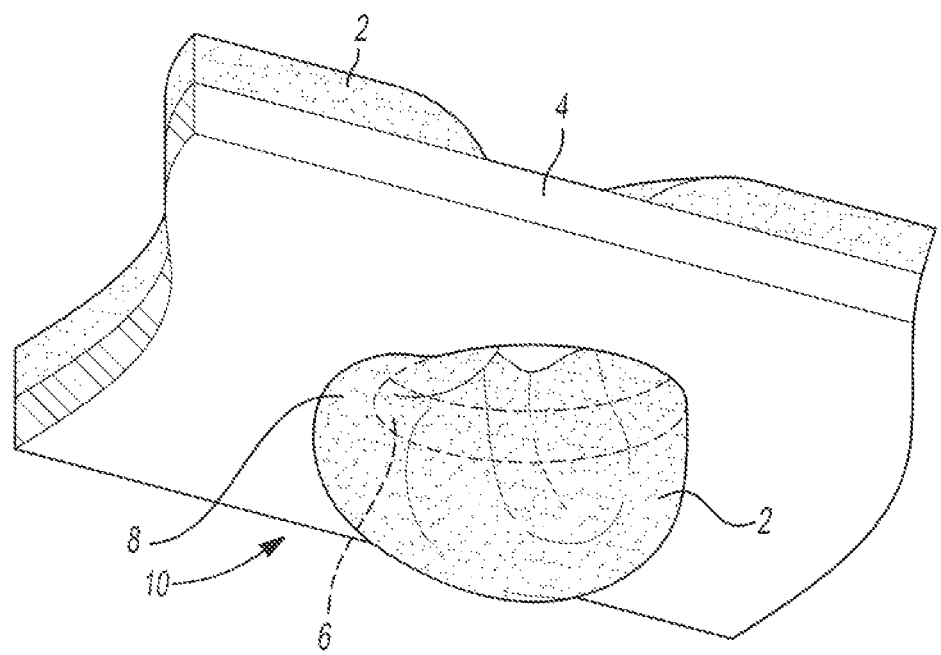
FIG. 2 is close up view illustrating one example of the activatable material applied to a member in accordance with the present teachings as shown in FIG. 1A.

FIG. 2 is a close-up view of the activatable material 2 of FIG. 1A. The activatable material 2 is extending through one of through-holes 6 and expands once through the through-hole 6 forming a mushroom shaped button 10. The mushroom shaped button 10 extends over the edges of the through-hole 6 and forms a mechanical interlock 8 so that the activatable material 2 is self-anchored to the article of manufacture 4 and resists being pulled back through the through-hole 6.

Figure 3A:
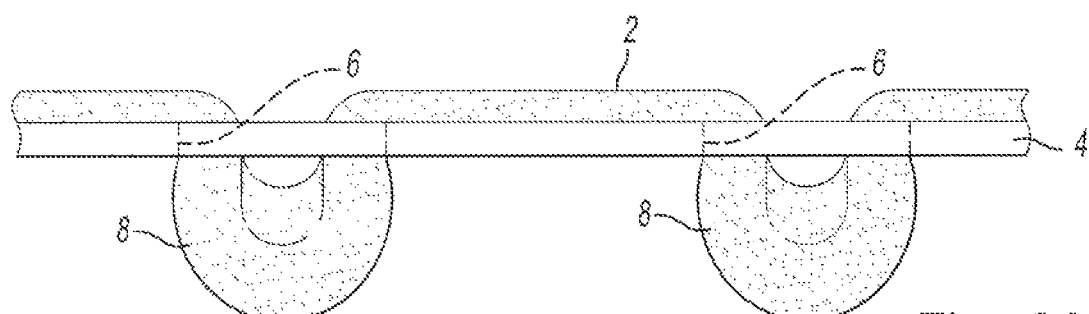
FIG. 3A is a side view illustrating one example of the activatable material, prior to activation, applied to a member in accordance with the present teachings.

FIG. 3A illustrates a side view of the activatable material 2 of FIG. 1A. The activatable material forms a semi-continuous bead that extends partially around the through-holes 6 and stops partially at the through-holes 6 as the activatable material 2 extends down and into the through-holes 6.

Figure 3B:
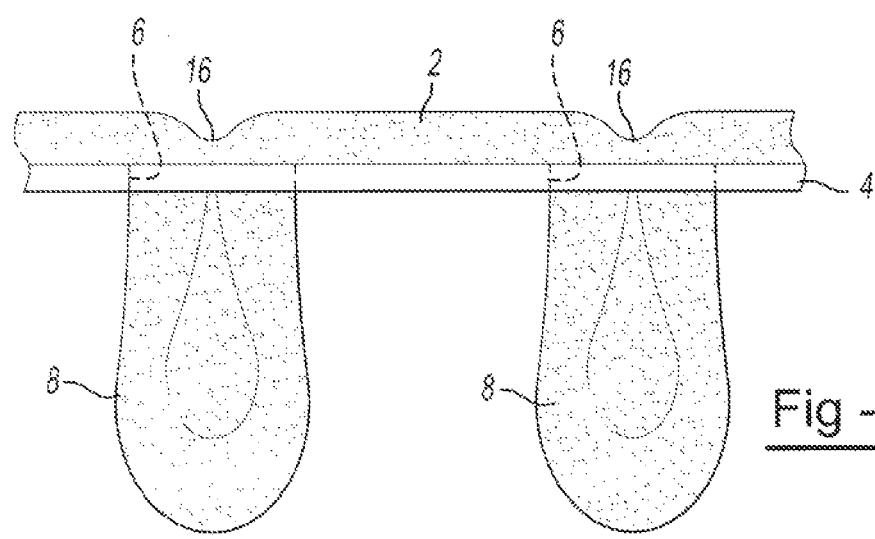
FIG. 3B is a side view illustrating the member and activatable material of FIG. 3A after activation of the activatable material.

FIG. 3B illustrates a side view of the activatable material of FIG. 1B. The activatable material when activated forms a more continuous bead along the article of manufacture 4. The activatable material 2 includes recesses 16 where the activatable material stopped at the holes in the pre-activation state. The expanded activatable material 2 forms a mechanical interlock 8 with the plurality of holes 6.

Figure 4:
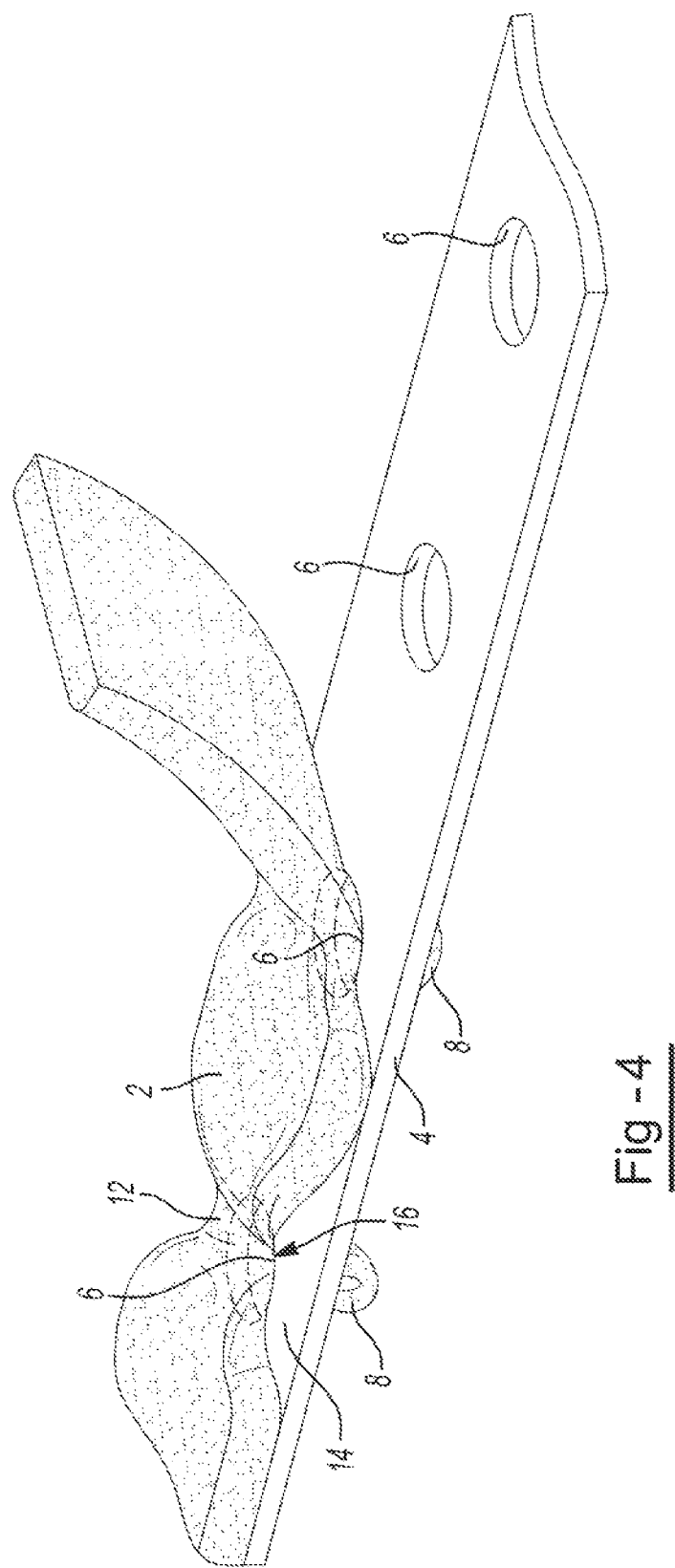
FIG. 4 illustrates the activatable material being applied to a substrate.

FIG. 4 illustrates the activatable material 2 being applied to the article of manufacture 4. The activatable material 2 is being forced through the holes 6 by the application of pressure only. The pressure forces the activatable material 2 though the plurality of holes 6 so that the activatable material 2 forms a mechanical interlock 8. The first hole has the activatable material 2 forced all of the way through the through-hole 6 so that on one side the activatable material extends around 12 the through-hole 6 and in another region the activatable material 2 stops 14 at the through-hole 6 forming a recess 16 in the activatable material. The second through-hole illustrates the activatable being forced through the through-hole 6 during the application process.

Figure 5:
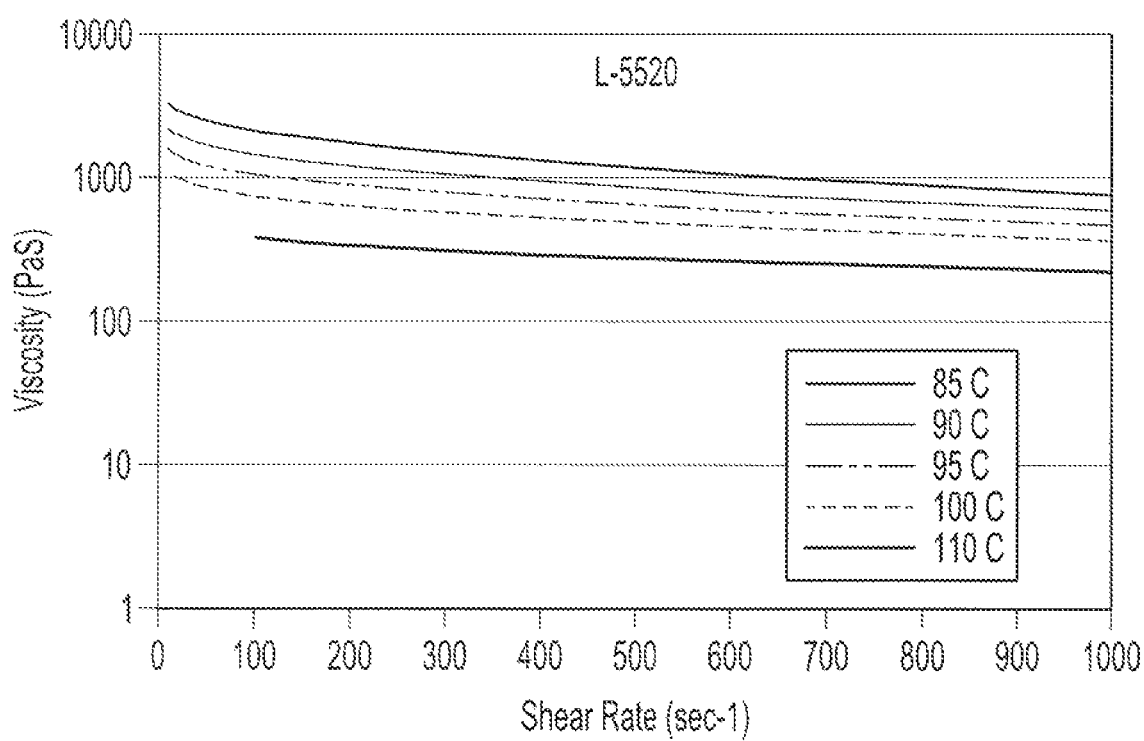
FIG. 5 illustrates some possible viscosities of the activatable material.

FIG. 5 illustrates the effect of temperature and shear rate on the viscosity of the activatable material. FIG. 5 shows that as the shear rate increases the viscosity of the activatable material decreases. The shear rate has a greater effect on the viscosity at lower temperatures than at higher temperatures. As illustrated, the viscosity of the activatable material at 110° C. remains linear; whereas, the viscosity of the activatable material at 85° C. is a generally exponential curve.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Teachings of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A structural assembly comprising:
a material in a pre-activation state;
an article of manufacture that includes a surface and one or more through holes;
wherein the material is applied to the article of manufacture in a continuous bead along a length of the article of manufacture;
wherein the material in the pre-activation state and the article of manufacture are mechanically interlocked due to the material forced through the one or more through holes; and
wherein the material in the pre-activation state includes:
a viscosity and the viscosity of the material is sufficient so that a pressure of applying the material is enough to move the material through the one or more through holes in the article of manufacture, and the material conforms to the one or more through holes to self-anchor the material to the article of manufacture to resist pull-though.

2. The structural assembly of claim 1, wherein the article of manufacture includes a plurality of through holes, wherein the material is applied to the article of manufacture as a continuous bead that extends at least partially along the article of manufacture and forms a mechanical interlock with the plurality of through holes in the article of manufacture so that the material resists being pulled through the holes, and the material spans between the plurality of through holes.

3. The structural assembly of claim 1, wherein the material and the article of manufacture are free of any mechanical fasteners that fixedly connect the material to the article of manufacture.

4. The structural assembly of claim 1, wherein the material is applied directly to the article of manufacture via a mini applicator.

5. The structural assembly of claim 1, wherein a mechanical interlock is created simultaneously as the material is applied to the article of manufacture.

6. The structural assembly of claim 1, wherein the continuous bead has a size in the largest dimension of about 2 mm to about 5 mm.

7. The structural assembly of claim 6, wherein the continuous bead has a size in the largest dimension of about 3 mm to about 4 mm.

8. The structural assembly of claim 1, wherein the material, in its pre-activation state, is tacky.

9. The structural assembly of claim 1, wherein the material when activated expands and hardens.

10. The structural assembly of claim 1, wherein the material changes size after the material is forced through the one or more through holes so that the material resists being pulled back through the one or more through holes.

11. The structural assembly of claim 1, wherein the material is applied directly to the article of manufacture using a mini applicator;
wherein the material and the article of manufacture are free of any mechanical fasteners that fixedly connect the material to the article of manufacture.

12. The structural assembly of claim 1, wherein the material is curable by exposure to UV light.

13. The structural assembly of claim 1, wherein a mechanical interlock is formed by raising application pressure when applying the material in a region surrounding at least one of the one or more through holes to force the material through the at least one of the one or more through holes.

14. The structural assembly of claim 1, wherein the material is capable of undergoing a first cure to secure the mechanical interlock between the article of manufacture and the material, and wherein the material is still capable of a final curing and expansion step.

15. The structural assembly of claim 14, wherein the material is activatable and includes a solid epoxy, a liquid epoxy, or both.

16. The structural assembly of claim 15, wherein the material further includes an impact modifier.

17. The structural assembly of claim 1, wherein the material includes an epoxy resin.

18. The structural assembly of claim 1, wherein the material in its pre-activation state has a viscosity of about 10,000 Pa-s or less between about 80° C. and about 120° C.

19. The structural assembly of claim 1, wherein the material in the pre-activation state includes at least three of the following: about 2 to about 80 percent by weight epoxy resin; about 2 to about 70 percent by weight polymer or oligomer; one or more additional polymers; about 2 to about 70 percent by weight impact modifier; up to about 5 parts by weight of a blowing agent; up to about 7 parts by weight of a curing agent; and a filler.

20. The structural assembly of claim 1, wherein the material when activated adheres and/or seals at least two articles of manufacture together.

* * * * *